Oct. 15, 1929. A. BOLLER 1,732,116
BACK SEAT FOR AUTOMOBILES
Original Filed Dec. 3, 1927
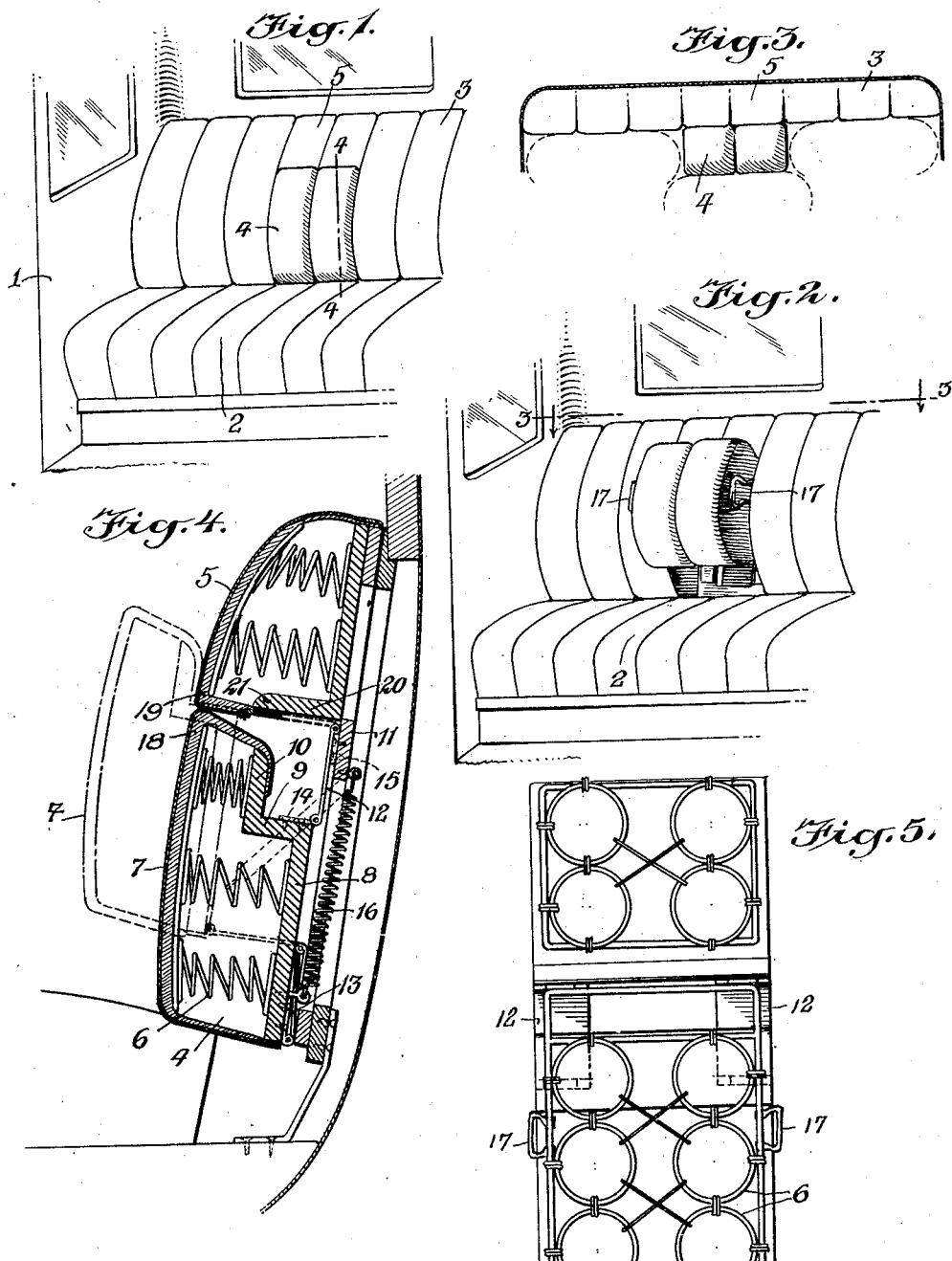
WITNESSES
INVENTOR
Alexander Boller
BY
ATTORNEY Patented Oct. 15, 1929

1,732,116

UNITED STATES PATENT OFFICE

ALEXANDER BOLLER, OF NEW YORK, N. Y.

BACK SEAT FOR AUTOMOBILES

Application filed December 3, 1927, Serial No. 237,471. Renewed July 3, 1929.

This invention relates to an improved back seat for automobiles or other vehicles, and has for an object to provide a construction wherein the back seat space is capable of use to greater advantage and comfort to passengers using the seat.

Another object of the invention is to provide a back seat for automobiles or other vehicles, wherein a portion of the seat is adjustable to a forward position so that a person resting against the forward portion of the seat will overlap to a certain extent the adjacent persons and have a back support.

A further object, more specifically, is to provide a seat for automobiles, wherein a central portion is swingable to a forward position so that a person using the center of the seat will set forwardly of the persons using the side portions of the seat, thus causing the shoulders of the person using the central portion of the seat to overlap the shoulders of the other persons and have a back support.

In the accompanying drawing—

Figure 1 is a fragmentary perspective view of the rear seat of an automobile and certain adjacent parts, the same being constructed according to the present invention.

Figure 2 is a view similar to Figure 1, but showing the adjustable central section in its outer or operative position.

Figure 3 is a sectional view through Figure 2, approximately on line 3—3.

Figure 4 is an enlarged sectional view through Figure 1, approximately on line 4—4.

Figure 5 is a plan view of the central seat portion shown in Figure 1, the front covering members being removed.

Referring to the accompanying drawing by numerals, 1 indicates part of an automobile, and 2 the seat which is provided with a back 3 of usual construction except for the central section 4. This section, when depressed or in its inoperative position, will be flush with the remaining part of the back 3 and will act as part of the back. In various automobiles of today, the rear seat is usually very wide and sufficiently long to accommodate three comparatively small persons, but will not accommodate three large persons without crowding. The fore and aft width of the seat is ample and sometimes greater than necessary.

In order to secure the greatest comfort for comparatively large persons, means have been provided according to the present invention, for advancing part of the back 3 so that the central portion will set forwardly four inches more or less, and thereby produce the result shown in dotted lines in Figure 3, where the shoulders of the central person overlap the shoulders of the remaining persons, and thus eliminate crowding. A separate member could be provided and superimposed on the back 3 to secure this result, though preferably the structure 4 is made normally as part of the back 3, but capable of forward movement in order to secure the results desired. The section 5 is of the usual construction found in backs 3 and, therefore, will need no detail description. The section 4, however, is a specially made section, though the springs 6 and covering member 7 are of the usual construction. Instead of resting on a permanent solid back board, the springs 6 rest on a specially formed back board 8 having an offset portion 9 merging into an overlapping shoulder 10. The board 8 is connected with the stationary back board 11 by double hinge structures 12 and 13. It will be noted that each of these hinge structures has a central connecting plate and end plates 14 and 15 connected to the plates 8 and 11 respectively. By reason of the central connecting link of these hinges, the section or portion 4 may be pulled outwardly and swung upwardly as shown in dotted lines in Figure 4, so that the shoulder 10 will overlap and rest against the lower part of section 5. The hinges 12 and 13 are so positioned that when the section 4 is moved to the dotted position shown in Figure 4 and the full line position shown in Figure 2, they will be slightly past dead center and, consequently, the retractile spring 16 will act to hold the parts in their outer or operative position. Also, when the section 4 is depressed, as shown in Figures 1 and 4, spring 16 will act to hold the parts in this position also, by reason of the location of the spring and hinges 12 and 13. A slight pull on section 4 in a direction outwardly, will cause the sections to quickly move to the position shown in Figure 2, and a comparatively slight pressure downwardly on section 4, when the same is in the position shown in Figure 2, will result in the section quickly moving back to the position shown in Figure 1. In order to assist in moving the section 4 outwardly, one or more handles 17 are connected to the section 4 at its sides. These handles may be seen when the section is in its outer position as shown in Figure 2, but will be out of view when section 4 has been retired to the position shown in Figure 1. It is, of course, understood that the section 4 could be moved directly outwardly or swung downwardly instead of upwardly, without departing from the spirit of the invention, though the arrangement shown has proven to be very desirable and is, therefore, at the present, the preferable and best form.

As particularly illustrated in Figure 4, the top end portion 18 of the covering structure 7, overlaps appreciably the overlapping shoulder 10 so as to contact with the lower end portion 19 of the cover 5 when the device is in its retired position as shown in Figure 1. This overhanging portion of the cover permits the shoulder 10 to be set back whereby the parts may be readily swung to the dotted position shown in Figure 4, or back to the retired position. It will also be noted from Figure 4, that the upstanding shoulder 20 is arranged so that the end section 21 will act as a shoulder or stop for receiving and supporting the hinge 12 when the parts are moved to their outer or operated position. The section 21 affords not only a stop for limiting the movement of the hinge and associated parts, but acts as an abutment for holding the parts in the proper position and supporting the hinge on its outer end, whereby none of the parts will become bent or distorted as the device is used from time to time.

When the device is in use as shown in Figure 3, three comparatively large persons may readily use seat 2, and the shoulders and body portion will not be crowded. As the seat 2 of various cars is amply wide, the person sitting in the center will have ample seat room, as usually the section 4 extends outwardly about four inches, though it might extend more or even less without departing from the spirit of the invention. By reason of the adjustability of the section, it may be used or not as preferred.

What I claim is:

1. A back seat for automobiles and the like, comprising a seat structure including a main section having an opening at the center, a swinging section arranged normally in said opening, hingedly mounted members for swinging said swinging section into and out of said opening, and a spring for resiliently holding said section in either of two positions.

2. In a back seat for automobiles, a main section having an opening, a swingable central section normally positioned in said opening, a double hinge connected with said section at each end for permitting said section to assume a position in front of said main section when swung to one position and to assume a position flush with said back when swung to a second position, and resilient means co-acting with said swinging section for holding said section in either of said positions.

3. In a seat for automobiles, a back formed with an opening centrally thereof and positioned to extend from the lower part of the back upwardly, a removable section normally fitted into said opening and filling the same, a pair of double hinges for swingably mounting said section, one hinge being mounted at the top and the other at the bottom of said removable section and positioned to swing said section in the arc of a circle whereby when the removable section is in one position the section will be located in said opening and when in another position will be in front of said opening will part slightly above the opening, and spring means for normally holding the section in either of the positions mentioned.

4. In a back seat for automobiles and the like, a main section and a swinging section, said swinging section being normally nested flush with the main section, means for swingably mounting the swinging section so that it may be swung to a position in front of part of said main section, said swinging section having a portion overlapping the main portion when moved to its forward position, said overlapping portion acting as an abutment to prevent the return of the swinging section until moved to a given position, and means for normally holding said swinging section in either of two positions.

5. In a back seat for automobiles and the like, an adjustable section, said section being capable of adjustment in a direction forwardly or rearwardly of the automobile, said section having a rigid base board formed with an offset shoulder adapted to overlap part of the back of said seat when adjusted to an outer position, said section having a plurality of springs engaging said back board, and covering members for said springs agreeing in color and general formation to the remaining part of the back of said seat.

6. In a seat for automobiles, a back formed with an opening centrally thereof, a removable section fitted into said opening, means co-acting with said removable section for holding the same substantially in front of the opening so that the front surface of said section will be an appreciable distance in front of the surface of the back, said removable section being formed with an overlapping rigid shoulder adapted to overlap the lower part of said back above said opening, said removable section being also formed with an overhanging cover portion connected with said overhanging shoulder, said overhanging cover portion projecting beyond said shoulder so as to contact with said back when the removable section is in a retired position.

7. In a seat for automobiles, a back formed with an opening centrally thereof and a removable section fitted into said opening, said section being formed with a projecting portion adapted to overlap the upper part of said back when the section is moved out of said opening, said projecting portion having an overhanging cover section adapted to engage the seat back at the top of said opening when the removable section is in said opening.

8. In a seat for automobiles, a back formed with an opening centrally thereof, said back being provided with a shoulder at the upper part of said opening, said shoulder being rigid, a removable section fitted into said opening, a pair of double hinges for hingedly mounting said removable section, said hinges being positioned respectively at the top and bottom of said removable section so as to permit the section to be swung out of said opening to a position with part overlapping the upper part of said back when moved to an outer position, said shoulder acting as a support for one of said hinges and as a stop for limiting its movement and for supporting the same in its outer position, and spring means acting to hold said section in said opening and also out of said opening when moved to either of its extreme positions.

9. In combination, an automobile seat of a size sufficient to accommodate more than one person and provided with a unitary seat portion, a back therefor formed with an opening substantially centrally thereof, a movable section fitted in said opening and means coacting with said movable section for holding the same substantially in front of the opening so that the front surface of said section will cooperate with said seat portion to form a seat section, the width of the seat portion being such that when the movable section is forwardly projected, a user of the back to one side of said movable section will be provided with unconfined portions laterally of the section.

Signed at New York city in the county of Bronx and State of New York this 1st day of Dec. A. D. 1927.

ALEXANDER BOLLER.